(12) United States Patent
Matsubara et al.

(10) Patent No.: US 10,179,310 B2
(45) Date of Patent: Jan. 15, 2019

(54) NATURAL-GAS PURIFICATION APPARATUS

(71) Applicant: MITSUBISHI HEAVY INDUSTRIES, LTD., Tokyo (JP)

(72) Inventors: Wataru Matsubara, Tokyo (JP); Masayuki Eda, Houston, TX (US); Shintaro Honjo, Tokyo (JP); Susumu Okino, Tokyo (JP); Hiromi Nakatani, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/475,931

(22) Filed: Mar. 31, 2017

(65) Prior Publication Data

US 2018/0280887 A1    Oct. 4, 2018

(51) Int. Cl.

| | |
|---|---|
| *B01D 53/22* | (2006.01) |
| *B01D 63/08* | (2006.01) |
| *B01D 63/06* | (2006.01) |
| *C10L 3/10* | (2006.01) |

(52) U.S. Cl.
CPC ............. *B01D 63/08* (2013.01); *B01D 53/22* (2013.01); *B01D 63/06* (2013.01); *C10L 3/101* (2013.01); *C10L 3/104* (2013.01); *B01D 2053/222* (2013.01); *B01D 2053/223* (2013.01); *B01D 2313/243* (2013.01); *B01D 2315/10* (2013.01); *B01D 2319/04* (2013.01); *C10L 2290/548* (2013.01)

(58) Field of Classification Search
CPC .... C10L 3/101; C10L 2290/548; C10L 3/104; B01D 2313/243; B01D 63/06; B01D 63/08; B01D 2319/04; B01D 2315/10; B01D 53/22; B01D 2053/222; B01D 2053/223

See application file for complete search history.

(56) References Cited

U.S. PATENT DOCUMENTS

| | | | | |
|---|---|---|---|---|
| 4,659,343 | A * | 4/1987 | Kelly ..................... | B01D 53/22 210/640 |
| 4,728,345 | A * | 3/1988 | Murphy ................. | B01D 69/12 210/490 |
| 4,750,918 | A * | 6/1988 | Sirkar .................... | B01D 53/22 423/229 |
| 4,772,295 | A * | 9/1988 | Kato .................. | B01D 53/1443 585/819 |

(Continued)

FOREIGN PATENT DOCUMENTS

| | | |
|---|---|---|
| JP | 2009-113994 A | 5/2009 |
| JP | 2016-155987 A | 9/2016 |

OTHER PUBLICATIONS

Perry "Perrys-Chemical-Engineers-handbook" 1999, The McGraw-Hill Companies, Inc., 7th ed., p. 1-22.*

*Primary Examiner* — Anthony R Shumate

(74) *Attorney, Agent, or Firm* — Westerman, Hattori, Daniels & Adrian, LLP

(57) ABSTRACT

A natural-gas purification apparatus includes: a compressor that adjusts the pressure of natural gas, and a separation device that separates natural-gas liquid and carbon dioxide from the natural gas after the pressure adjustment by the compressor through a natural-gas-liquid separation membrane and a carbon-dioxide separation membrane.

5 Claims, 2 Drawing Sheets

(56) References Cited

U.S. PATENT DOCUMENTS

| | | | | |
|---|---|---|---|---|
| 4,892,564 A * | 1/1990 | Cooley | B01D 53/226 | 585/818 |
| 4,961,758 A * | 10/1990 | Dobitz | B01D 61/38 | 585/818 |
| 4,995,888 A * | 2/1991 | Beaupre | B01D 19/0031 | 423/229 |
| 5,236,474 A * | 8/1993 | Schofield | B01D 53/22 | 95/47 |
| 5,557,030 A * | 9/1996 | Markovs | C07C 7/13 | 585/802 |
| 5,860,476 A * | 1/1999 | Kjos | B01D 45/12 | 166/243 |
| 5,972,080 A * | 10/1999 | Nagata | C08G 73/10 | 95/54 |
| 6,128,919 A * | 10/2000 | Daus | B01D 53/226 | 62/624 |
| 6,228,145 B1 * | 5/2001 | Falk-Pedersen | B01D 53/1475 | 95/44 |
| 6,361,583 B1 * | 3/2002 | Pinnau | B01D 53/228 | 95/45 |
| 7,837,877 B2 * | 11/2010 | Cao | B01D 61/364 | 210/502.1 |
| 7,943,543 B1 * | 5/2011 | Liu | B01D 53/228 | 502/4 |
| 8,133,308 B2 * | 3/2012 | Lively | B01D 53/0438 | 165/177 |
| 8,337,587 B2 * | 12/2012 | Gearhart | B01D 53/002 | 62/624 |
| 2002/0124722 A1 * | 9/2002 | Baker | B01D 53/228 | 95/45 |
| 2004/0099138 A1 * | 5/2004 | Karode | B01D 3/145 | 95/214 |
| 2007/0006732 A1 * | 1/2007 | Mitariten | B01D 53/0462 | 95/237 |
| 2009/0156875 A1 * | 6/2009 | Tomioka | B01D 3/101 | 585/802 |
| 2010/0167910 A1 * | 7/2010 | Odueyungbo | B01D 61/142 | 502/24 |
| 2010/0248335 A1 * | 9/2010 | Komatsu | B01D 61/20 | 435/262.5 |
| 2012/0079852 A1 * | 4/2012 | Northrop | C07C 7/005 | 62/620 |
| 2015/0152722 A1 * | 6/2015 | Carmody | E21B 43/40 | 166/267 |
| 2016/0279561 A1 * | 9/2016 | Burgers | B01D 53/226 | |

* cited by examiner

NATURAL-GAS PURIFICATION APPARATUS

TECHNICAL FIELD

The present invention relates to a natural-gas purification apparatus for purifying natural gas from the ground or the like by separating carbon dioxide from the natural gas.

BACKGROUND ART

Natural gases discharged to the surface of the ground from high-temperature high-pressure underground areas such as oil and gas fields include: dry gases with one to two carbon atoms such as methane ($CH_4$) and ethane ($C_2H_6$), which are in gaseous form even at normal temperature and pressure; natural-gas liquids containing components with three to four carbon atoms such as propane ($C_3H_8$) and butane ($C_4H_{10}$), which are in gaseous format normal temperature and pressure but are easily liquefied when pressurized or cooled, and components with five or more carbon atoms such as pentane ($C_5H_{12}$), which is in liquid form at normal temperature and pressure; and non-hydrocarbon gases such as carbon dioxide ($CO_2$).

As described in, for example, Patent Literature 1, such a natural gas is pressurized (to 0.5 to 2 MPa) by a compressor and cooled (to 0 to 20° C.) by a cooling unit to undergo gas-liquid separation in which a part of its natural-gas liquid is liquefied. The natural gas is then raised in temperature by being heated (to 50 to 80° C.) by a heating unit. Thereafter, the carbon dioxide is passed through a carbon-dioxide separation membrane to a lower pressure side, so that the carbon dioxide is separated and removed. As a result, the natural gas is purified.

CITATION LIST

Patent Literatures

{Patent Literature 1} Japanese Patent Application Publication No. 2016-155987
{Patent Literature 2} Japanese Patent Application Publication No. 2009-113994

SUMMARY OF INVENTION

Technical Problem

Although the above system described in Patent Literature 1 can purify natural gas, it includes a compressor, a cooling unit, a heating unit, and a carbon-dioxide separation device, and these are arranged in this order from an upstream side in the direction of gas flow. Thus, the system has problems that the system itself is large in size and cannot efficiently separate and remove natural-gas liquid and carbon dioxide from natural gas.

Use of a natural-gas-liquid separation membrane that separates apart of natural-gas liquid from natural gas in the above system has been considered. In this case, the system includes a compressor, a natural-gas-liquid separation device using a natural-gas-liquid separation membrane, and a carbon-dioxide separation device using a carbon-dioxide separation membrane, and these are arranged in this order from an upstream side in the direction of gas flow. Thus, the system has problems that the system itself is large in size and cannot efficiently separate and remove natural-gas liquid and carbon dioxide from natural gas.

In view of the above, the present invention has been made to solve the above-mentioned problems, and an object thereof is to provide a natural-gas purification apparatus which is small in size but is capable of efficiently separating and removing carbon dioxide from natural gas.

Solution to Problem

A natural-gas purification apparatus according to a first aspect for solving the problem described above is a natural-gas purification apparatus for purifying natural gas by separating carbon dioxide from the natural gas, including: a pressure adjuster that adjusts a pressure of natural gas; and a separator that separates natural-gas liquid and carbon dioxide from the natural gas after the pressure adjustment by the pressure adjuster through a natural-gas-liquid separation membrane and a carbon-dioxide separation membrane.

A natural-gas purification apparatus according to a second aspect for solving the problem described above is the natural-gas purification apparatus according to the first aspect in which the separator includes a device body including a gas inlet port through which to receive the natural gas, a natural-gas-liquid outlet port through which to discharge the natural-gas liquid, a carbon-dioxide outlet port through which to discharge the carbon dioxide, and a gas outlet port through which to discharge the natural gas from which the natural-gas liquid and the carbon dioxide have been separated, each of the natural-gas-liquid separation membrane and the carbon-dioxide separation membrane is in a flat shape, and the natural-gas-liquid separation membrane and the carbon-dioxide separation membrane are arranged inside the device body in such a way as to partition an inside of the device body into a first chamber including the gas inlet port and the gas outlet port, a second chamber including the natural-gas-liquid outlet port, and a third chamber including the carbon-dioxide outlet port.

A natural-gas purification apparatus according to a third aspect for solving the problem described above is the natural-gas purification apparatus according to the second aspect in which the gas inlet port and the gas outlet port are arranged opposite to each other, and the natural-gas-liquid separation membrane and the carbon-dioxide separation membrane are arranged parallel to each other.

A natural-gas purification apparatus according to a fourth aspect for solving the problem described above is the natural-gas purification apparatus according to the first aspect in which the separator includes a device body including a gas inlet port through which to receive the natural gas, a natural-gas-liquid outlet port through which to discharge the natural-gas liquid, a carbon-dioxide outlet port through which to discharge the carbon dioxide, and a gas outlet port through which to discharge the natural gas from which the natural-gas liquid and the carbon dioxide have been separated, a first partition plate partitioning an inside of the device body into a first chamber including the gas inlet port and the gas outlet port and a second chamber including the natural-gas-liquid outlet port, and a second partition plate partitioning the inside of the device body into the first chamber and a third chamber including the carbon-dioxide outlet port, each of the natural-gas-liquid separation membrane and the carbon-dioxide separation membrane is in a tubular shape, the natural-gas-liquid separation membrane is arranged inside the first chamber in such a way as to open only to the second chamber through the first partition plate, and the carbon-dioxide separation membrane is arranged inside the first chamber in such a way as to open only to the third chamber through the second partition plate.

A natural-gas purification apparatus according to a fifth aspect for solving the problem described above is the natural-gas purification apparatus according to the fourth aspect in which the gas inlet port and the gas outlet port are arranged opposite to each other, and the natural-gas-liquid separation membrane and the carbon-dioxide separation membrane are arranged parallel to each other.

A natural-gas purification apparatus according to a sixth aspect for solving the problem described above is the natural-gas purification apparatus according to the fifth aspect in which a plurality of the natural-gas-liquid separation membranes and a plurality of the carbon-dioxide separation membranes are arranged adjacently to each other at equal intervals in a front-rear direction.

Advantageous Effect of Invention

According to the present invention, the separator can simultaneously perform the separation and removal of natural-gas liquid from natural gas with the natural-gas-liquid separation membrane and the separation and removal of carbon dioxide from the natural gas with the carbon-dioxide separation membrane. Hence, the natural-gas purification apparatus can be smaller in size than conventional apparatuses including a pressure adjuster, a natural-gas-liquid separator, a heater, and a carbon-dioxide separator arranged in this order from an upstream side in the direction of gas flow. Also, the natural-gas purification apparatus can efficiently separate and remove carbon dioxide from the natural gas while preventing the generation of a liquid film over the carbon-dioxide separation membrane.

DESCRIPTION OF EMBODIMENTS

Embodiments of a natural-gas purification apparatus according to the present invention will be described with reference to the drawings. It is to be noted that the present invention is not limited only to the following embodiments to be described with reference to the drawings.

First Embodiment

A natural-gas purification apparatus according to a first embodiment of the present invention will be described with reference to FIG. 1.

Figure 1:
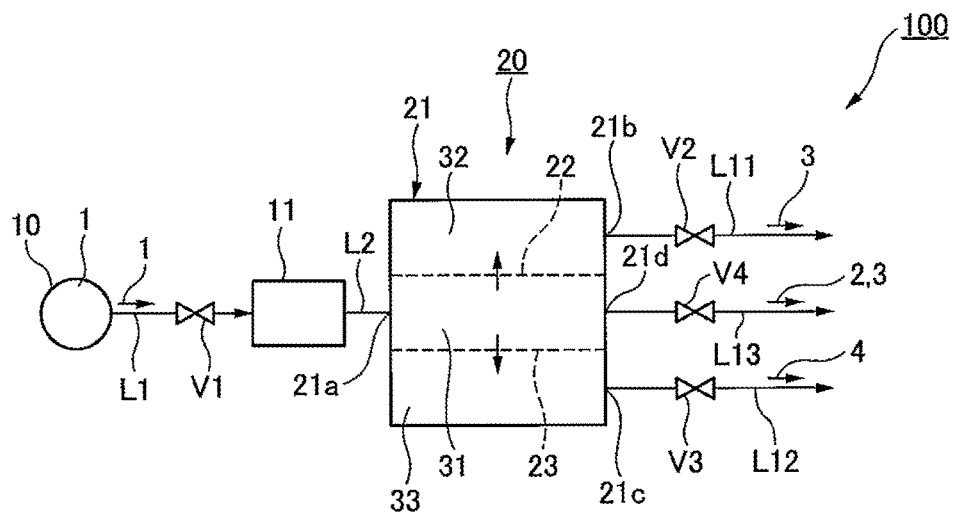
FIG. 1 illustrates a schematic configuration diagram of a natural-gas purification apparatus according to a first embodiment of the present invention.

As illustrated in FIG. 1, a natural-gas purification apparatus 100 according to this embodiment includes a compressor 11 and a separation device 20 that separates two components, namely, a part of natural-gas liquid 3 and carbon dioxide 4, from natural gas 1. An inlet port of the compressor 111 is connectable to a natural-gas source 10 that discharges the natural gas 1 from, for example, the ground by a gas supply pipe L1 provided with an on-off valve V1. An outlet port of the compressor 111 is connected to a gas inlet port of the separation device 20, which will be described later in detail, by a gas supply pipe L2.

The separation device 20 includes a separation-device body 21 that serves as a housing, a natural-gas-liquid separation membrane 22, and a carbon-dioxide separation membrane 23. The separation-device body 21 includes a gas inlet port 21a, a natural-gas-liquid outlet port 21b, a carbon-dioxide outlet port 21c, and a gas outlet port 21d. The gas inlet port 21a and the gas outlet port 21d are preferably arranged opposite to each other.

Each of the natural-gas-liquid separation membrane 22 and the carbon-dioxide separation membrane 23 is in a flat shape, for example.

The natural-gas-liquid separation membrane 22 and the carbon-dioxide separation membrane 23 are arranged inside the separation-device body 21 in such a way as to partition the inside of the separation-device body 21 into a first chamber 31 including the gas inlet port 21a and the gas outlet port 21d, a second chamber 32 including the natural-gas-liquid outlet port 21b, and a third chamber 33 including the carbon-dioxide outlet port 21c.

The natural-gas-liquid separation membrane 22 and the carbon-dioxide separation membrane 23 are preferably arranged parallel to each other.

The natural-gas-liquid separation membrane 22 is a membrane capable of separating and removing a part of the natural-gas liquid 3 from gas. For example, the membrane with the product name LPG-Sep, manufactured by Membrane Technology and Research Incorporated (US), or the like is usable as the natural-gas-liquid separation membrane 22.

The carbon-dioxide separation membrane 23 is a membrane capable of separating and removing carbon dioxide from gas. For the carbon-dioxide separation membrane 23, it is preferable to use a membrane of cellulose acetate, polyimide, a fluororesin, or the like with a withstand temperature of 50 C or lower, and more preferable to use a membrane with a withstand temperature of 80 C or lower.

The natural-gas-liquid outlet port 21b is connected to the outside of the system by a natural-gas-liquid discharge pipe L11 provided with an on-off valve V2. The carbon-dioxide outlet port 21c is connected to the outside of the system by a carbon-dioxide discharge pipe L12 provided with an on-off valve V3. The post-separation-gas outlet port 21d is connected to the outside of the system by a gas discharge pipe L13 provided with an on-off valve V4.

In the above natural-gas purification apparatus 100, components such as the compressor 11, the gas supply pipes L1 and L2, the natural-gas-liquid discharge pipe L11, the carbon-dioxide discharge pipe L12, the gas discharge pipe L13, and the on-off valves V1 to V4 constitute a pressure adjuster.

Next, a natural-gas purification method using the above natural-gas purification apparatus 100 according to this embodiment will be described.

First, the composition of the natural gas 1 from the natural-gas source 10 (the proportions of dry gas 2, the natural-gas liquid 3, the carbon dioxide 4, and the like) is figured out in advance using analysis equipment such as a gas chromatograph (GC).

The actuation of the compressor 111 and the opening degrees of the on-off valves V1 to V4 are adjusted and controlled according to this composition of the natural gas 1. Meanwhile, the opening degrees of the on-off valves V1 to V4 may be adjusted and controlled automatically by an arithmetic control device (not illustrated) or manually by an operator.

Thus, the natural gas 1 supplied from the natural-gas source 10 is pressurized (to 0.5 to 2 MPa) by the compressor 11 and then supplied to the inside of the first chamber 31 of the separation device 20.

When the natural gas 1 pressurized by the compressor 11 is supplied to the inside of the first chamber 31 of the separation device 20, a part of the natural-gas liquid 3 in the natural gas 1 is moved through the natural-gas-liquid separation membrane 22 to the second chamber 32, which is a lower pressure side (natural-gas-liquid flow side), and then discharged to the outside of the system through the natural-gas-liquid outlet port 21b, the natural-gas-liquid discharge pipe L11, and the on-off valve V2. Also, the carbon dioxide 4 in the natural gas is moved through the carbon-dioxide separation membrane 23 to the third chamber 33, which is a lower pressure side (carbon-dioxide flow side), and then discharged to the outside of the system through the carbon-dioxide outlet port 21c, the carbon-dioxide discharge pipe L12, and the on-off valve V3. On the other hand, the remaining gas (the dry gas 2 and the remaining part of the natural-gas liquid 3) is discharged to the outside of the system through the gas outlet port 21d, the gas discharge pipe L13, and the on-off valve V4 without being liquefied.

Here, as the carbon-dioxide separation membrane 23 separates and removes the carbon dioxide 4 from the natural gas 1, the carbon-dioxide separation membrane 23 is cooled and experiences a temperature drop that can cause generation of a liquid film. However, since the natural-gas-liquid separation membrane 22 separates and removes a part of the natural-gas liquid 3 simultaneously with the separation and removal of the carbon dioxide 4, the generation of a liquid film is prevented.

Since the liquefaction of apart of the natural-gas liquid 3 is prevented as above, the natural gas 1 can be efficiently purified.

Thus, according to this embodiment, the separation device 20 can simultaneously perform the separation and removal of a part of the natural-gas liquid 3 from the natural gas 1 with the natural-gas-liquid separation membrane 22 and the separation and removal of the carbon dioxide 4 from the natural gas 1 with the carbon-dioxide separation membrane 23. Hence, the natural-gas purification apparatus 100 can be smaller in size than conventional apparatuses including a compressor, a cooling unit, a heating unit, and a carbon-dioxide separation device arranged in this order from an upstream side in the direction of gas flow. Also, the natural-gas purification apparatus 100 can efficiently separate and remove the carbon dioxide 4 from the natural gas 1 while preventing the generation of a liquid film over the carbon-dioxide separation membrane 23.

The gas inlet port 21a and the gas outlet port 21d of the separation device 20 are arranged opposite to each other, and the natural-gas-liquid separation membrane 22 and the carbon-dioxide separation membrane 23 are arranged parallel to each other. Thus, the natural gas 1 pressurized by the compressor 11 equally contacts the natural-gas-liquid separation membrane 22 and the carbon-dioxide separation membrane 23 from when the natural gas 1 is supplied to the inside of the first chamber 31 of the separation-device body 21 through the gas inlet port 21a to when the natural gas 1 is discharged to the gas discharge pipe L13 through the gas outlet port 21d. Hence, a part of the natural-gas liquid 3 and the carbon dioxide 4 can be efficiently separated and removed from the natural gas 1.

Second Embodiment

A natural-gas purification apparatus according to a second embodiment of the present invention will be described with reference to FIG. 2 to FIG. 4.

In this embodiment, the configuration of the separation device included in the above-described natural-gas purification apparatus is changed. Besides this, the natural-gas purification apparatus according to this embodiment includes the same devices as the above-described natural-gas purification apparatus.

Figure 2:
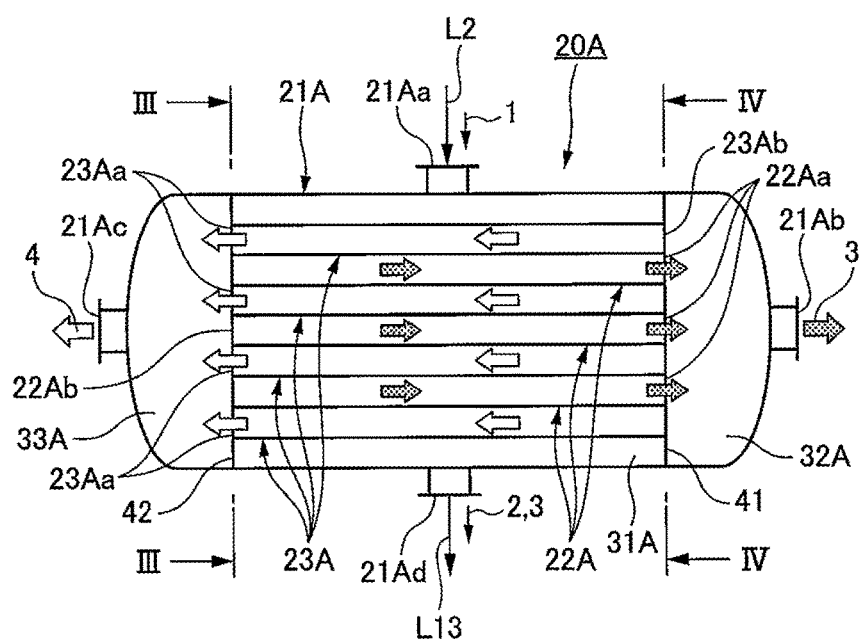
FIG. 2 illustrates a schematic configuration diagram of a natural-gas purification apparatus according to a second embodiment of the present invention.
Figure 3:
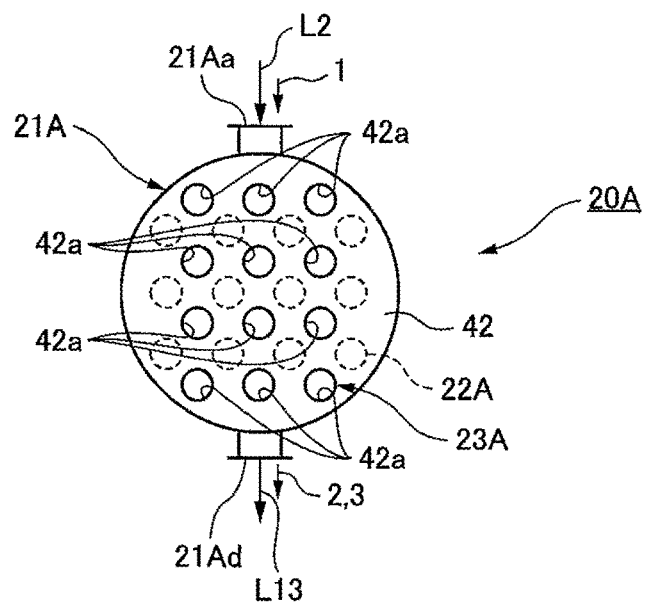
FIG. 3 is a view seen in the direction of arrows III in FIG. 2.
Figure 4:
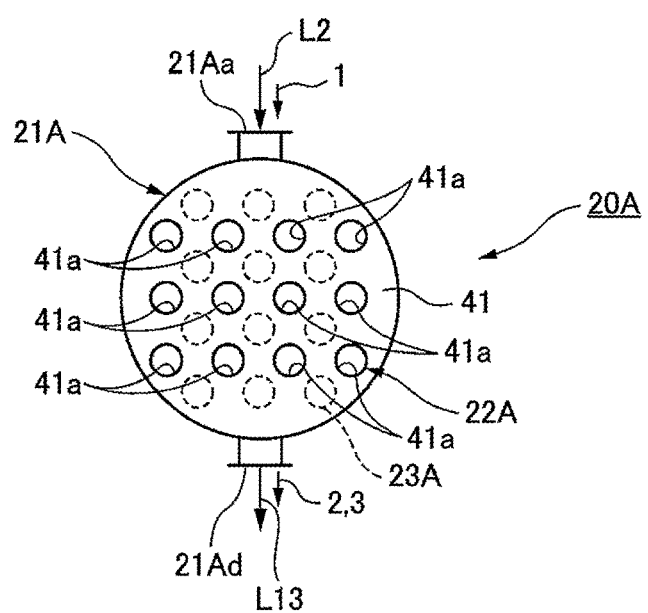
FIG. 4 is a view seen in the direction of arrows IV in FIG. 2.

As illustrated in FIG. 2 to FIG. 4, the natural-gas purification apparatus according to this embodiment includes a separation device 20A. The separation device 20A includes a separation-device body 21A that serves as a housing, natural-gas-liquid separation membranes 22A, and carbon-dioxide separation membranes 23A. The separation-device body 21A includes a gas inlet port 21Aa, a gas outlet port 21Ad, a natural-gas-liquid outlet port 21Ab, and a carbon-dioxide outlet port 21Ac. The gas inlet port 21Aa and the gas outlet port 21Ad are preferably arranged opposite to each other.

As in the natural-gas-liquid separation membrane 22, each natural-gas-liquid separation membrane 22A is a membrane capable of separating and removing a part of the natural-gas liquid 3 from the natural gas 1. For example, the membrane with the product name LPG-Sep, manufactured by Membrane Technology and Research Incorporated (US), or the like is usable as the natural-gas-liquid separation membrane 22A.

As in the carbon-dioxide separation membrane 23, each carbon-dioxide separation membrane 23A is a membrane capable of separating and removing carbon dioxide from gas. For the carbon-dioxide separation membrane 23A, it is preferable to use a membrane of cellulose acetate, polyimide, a fluororesin, or the like with a withstand temperature of 50 C or lower, and more preferable to use a membrane with a withstand temperature of 80 C or lower.

The above separation device 20A further includes: a first partition plate 41 that partitions the inside of the separation-device body 21A into a first chamber 31A including the gas inlet port 21Aa and the gas outlet port 21Ad and a second chamber 32A including the natural-gas-liquid outlet port 21Ab; and a second partition plate 42 that partitions the inside of the separation-device body 21A into the first chamber 31A and a third chamber 33A including the carbon-dioxide outlet port 21Ac.

Each natural-gas-liquid separation membrane 22A is in, for example, a tubular shape opened at one end 22Aa and closed at the other end 22Ab. In the first partition plate 41, openings 41a are formed at positions coinciding with the positions at which the natural-gas-liquid separation membranes 22A are attached. The natural-gas-liquid separation membranes 22A are arranged inside the first chamber 31A in such a way as to open to (communicate with) only the second chamber 32A through the first partition plate 41. Each carbon-dioxide separation membrane 23A is in, for example, a tubular shape opened at one end 23Aa and closed at the other end 23Ab. In the second partition plate 42, openings 42a are formed at positions coinciding with the positions at which the carbon-dioxide separation membranes 23A are attached. The carbon-dioxide separation membranes 23A are arranged inside the first chamber 31A in such a way as to open to (communicate with) only the third chamber 33A through the second partition plate 42.

The natural-gas-liquid separation membranes 22A and the carbon-dioxide separation membranes 23A are arranged parallel to each other. The natural-gas-liquid separation membranes 22A and the carbon-dioxide separation membranes 23A are arranged adjacently to each other at equal intervals in the front-rear direction (the left-right direction in FIG. 3 and FIG. 4).

In the above natural-gas purification apparatus, components such as the compressor 11, the gas supply pipes L1 and L2, the natural-gas-liquid discharge pipe L11, the carbon-dioxide discharge pipe L12, and the on-off valves V1 to V4 constitute a pressure adjuster.

Next, a natural-gas purification method using the above natural-gas purification apparatus according to this embodiment will be described.

First, the composition of the natural gas 1 from the natural-gas source 10 (the proportions of the dry gas 2, the natural-gas liquid 3, the carbon dioxide 4, and the like) is figured out in advance using analysis equipment such as a gas chromatograph (GC).

The actuation of the compressor 111 and the opening degrees of the on-off valves V1 to V4 are adjusted and controlled according to this composition of the natural gas 1. Meanwhile, the opening degrees of the on-off valves V1 to V4 may be adjusted and controlled automatically by an arithmetic control device (not illustrated) or manually by an operator.

Thus, the natural gas 1 supplied from the natural-gas source 10 is pressurized (to 0.5 to 2 MPa) by the compressor 11 and then supplied to the inside of the first chamber 31A of the separation device 20A.

When the natural gas 1 pressurized by the compressor 11 is supplied to the inside of the first chamber 31A of the separation device 20A, apart of the natural-gas liquid 3 in the natural gas 1 is moved through the natural-gas-liquid separation membranes 22A to the second chamber 32A, which is a lower pressure side (natural-gas-liquid flow side), and then discharged to the outside of the system through the natural-gas-liquid outlet port 21Ab, the natural-gas-liquid discharge pipe L11, and the on-off valve V2. Also, the carbon dioxide 4 in the natural gas 1 is moved through the carbon-dioxide separation membranes 23A to the third chamber 33A, which is a lower pressure side (carbon-dioxide flow side), and then discharged to the outside of the system through the carbon-dioxide outlet port 21Ac, the carbon-dioxide discharge pipe L12, and the on-off valve V3. On the other hand, the remaining gas (the dry gas 2 and the remaining part of the natural-gas liquid 3) is discharged to the outside of the system through the gas outlet port 21Ad, the gas discharge pipe L13, and the on-off valve V4 without being liquefied.

Here, as the carbon-dioxide separation membranes 23A separate and remove the carbon dioxide 4 from the natural gas 1, the carbon-dioxide separation membranes 23A are cooled and experience a temperature drop that can cause generation of a liquid film. However, since the natural-gas-liquid separation membranes 22A separate and remove a part of the natural-gas liquid 3 simultaneously with the separation and removal of the carbon dioxide 4, the generation of a liquid film is prevented.

Since the liquefaction of apart of the natural-gas liquid 3 is prevented as above, the natural gas 1 can be efficiently purified.

Thus, according to this embodiment, the separation device 20A can simultaneously perform the separation and removal of a part of the natural-gas liquid 3 from the natural gas 1 with the natural-gas-liquid separation membranes 22A and the separation and removal of the carbon dioxide 4 from the natural gas 1 with the carbon-dioxide separation membranes 23A. Hence, the natural-gas purification apparatus can be smaller in size than conventional apparatuses including a compressor, a cooling unit, a heating unit, and a carbon-dioxide separation device arranged in this order from an upstream side in the direction of gas flow. Also, the natural-gas purification apparatus can efficiently separate and remove the carbon dioxide 4 from the natural gas 1 while preventing the generation of a liquid film over the carbon-dioxide separation membranes 23A.

The gas inlet port 21Aa and the gas outlet port 21Ad of the separation device 20A are arranged opposite to each other, and the natural-gas-liquid separation membranes 22A and the carbon-dioxide separation membranes 23A are arranged inside the first chamber 31A. Thus, a part of the natural-gas liquid 3 and the carbon dioxide 4 can be gradually separated and removed from the natural gas 1 inside the first chamber 31A. Generation of a liquid film due to abrupt temperature drop can be prevented.

The natural-gas-liquid separation membranes 22A and the carbon-dioxide separation membranes 23A are arranged parallel to each other. Thus, the natural gas 1 after the pressure adjustment by the compressor 11 equally contacts the natural-gas-liquid separation membranes 22A and the carbon-dioxide separation membranes 23A from when the natural gas 1 is supplied to the inside of the first chamber 31A of the separation-device body 21A through the gas inlet port 21Aa to when the natural gas 1 is discharged to the gas discharge pipe L13 through the gas outlet port 21Ad. Hence, a part of the natural-gas liquid 3 and the carbon dioxide 4 can be efficiently separated and removed from the natural gas 1.

REFERENCE SIGNS LIST

1 NATURAL GAS
2 DRY GAS
3 NATURAL-GAS LIQUID
4 CARBON DIOXIDE
10 NATURAL-GAS SOURCE
11 COMPRESSOR
20, 20A SEPARATION DEVICE (SEPARATOR)
21, 21A SEPARATION-DEVICE BODY
21a, 21Aa GAS INLET PORT
21b, 21Ab NATURAL-GAS-LIQUID OUTLET PORT
21c, 21Ac CARBON-DIOXIDE OUTLET PORT
21d, 21Ad GAS OUTLET PORT
22, 22A NATURAL-GAS-LIQUID SEPARATION MEMBRANE
22Aa ONE END (OPEN END)
22Ab OTHER END
23, 23A CARBON-DIOXIDE SEPARATION MEMBRANE
23Aa ONE END (OPEN END)
23Ab OTHER END
31, 31A FIRST CHAMBER
32, 32A SECOND CHAMBER
33, 33A THIRD CHAMBER
41 FIRST PARTITION PLATE
41a OPENING (HOLE)
42 SECOND PARTITION PLATE
42a OPENING (HOLE)
100 NATURAL-GAS PURIFICATION APPARATUS
L1 TO L2 GAS SUPPLY PIPE
L11 NATURAL-GAS-LIQUID DISCHARGE PIPE
L12 CARBON-DIOXIDE DISCHARGE PIPE
L13 GAS DISCHARGE PIPE
V1 TO V4 ON-OFF VALVE

The invention claimed is:

1. A natural-gas purification apparatus for purifying natural gas by separating carbon dioxide from the natural gas, comprising:
a pressure adjuster that adjusts a pressure of natural gas; and a separator that separates natural-gas liquid and carbon dioxide from the natural gas after the pressure adjustment by the pressure adjuster through a natural-gas-liquid separation membrane and a carbon-dioxide separation membrane;

wherein the separator includes a device body including a gas inlet port through which to receive the natural gas, a natural-gas-liquid outlet port through which to discharge the natural-gas liquid, a carbon-dioxide outlet port through which to discharge the carbon dioxide, and a gas outlet port through which to discharge the natural gas from which the natural-gas liquid and the carbon dioxide have been separated, each of the natural-gas-liquid separation membrane and the carbon-dioxide separation membrane is in a flat shape, and the natural-gas-liquid separation membrane and the carbon-dioxide separation membrane are arranged inside the device body in such a way as to partition an inside of the device body into a first chamber including the gas inlet port and the gas outlet port, a second chamber including the natural-gas-liquid outlet port, and a third chamber including the carbon-dioxide outlet port.

2. The natural-gas purification apparatus according to claim 1, wherein the gas inlet port and the gas outlet port are arranged opposite to each other, and the natural-gas-liquid separation membrane and the carbon-dioxide separation membrane are arranged parallel to each other.

3. A natural-gas purification apparatus for purifying natural gas by separating carbon dioxide from the natural gas, comprising:

a pressure adjuster that adjusts a pressure of natural gas; and a separator that separates natural-gas liquid and carbon dioxide from the natural gas after the pressure adjustment by the pressure adjuster through a natural-gas-liquid separation membrane and a carbon-dioxide separation membrane;

wherein the separator includes a device body including a gas inlet port through which to receive the natural gas, a natural-gas-liquid outlet port through which to discharge the natural-gas liquid, a carbon-dioxide outlet port through which to discharge the carbon dioxide, and a gas outlet port through which to discharge the natural gas from which the natural-gas liquid and the carbon dioxide have been separated, a first partition plate partitioning an inside of the device body into a first chamber including the gas inlet port and the gas outlet port and a second chamber including the natural-gas-liquid outlet port, and a second partition plate partitioning the inside of the device body into the first chamber and a third chamber including the carbon-dioxide outlet port, each of the natural-gas-liquid separation membrane and the carbon-dioxide separation membrane is in a tubular shape, the natural-gas-liquid separation membrane is arranged inside the first chamber in such a way as to open only to the second chamber through the first partition plate, and the carbon-dioxide separation membrane is arranged inside the first chamber in such a way as to open only to the third chamber through the second partition plate.

4. The natural-gas purification apparatus according to claim 3, wherein the gas inlet port and the gas outlet port are arranged opposite to each other, and the natural-gas-liquid separation membrane and the carbon-dioxide separation membrane are arranged parallel to each other.

5. The natural-gas purification apparatus according to claim 4, wherein a plurality of the natural-gas-liquid separation membranes and a plurality of the carbon-dioxide separation membranes are arranged adjacently to each other at equal intervals in a front-rear direction.

* * * * *